(12) United States Patent
Takeuchi et al.

(10) Patent No.: US 12,371,048 B2
(45) Date of Patent: Jul. 29, 2025

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Yusuke Takeuchi, Toyota (JP); Kohei Shintani, Nisshin (JP); Hisashi Matsuda, Tokyo (JP); Daisuke Toyoda, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 18/466,097

(22) Filed: Sep. 13, 2023

(65) Prior Publication Data

US 2024/0166228 A1 May 23, 2024

(30) Foreign Application Priority Data

Nov. 22, 2022 (JP) ................. 2022-186699

(51) Int. Cl.
*B60W 50/14* (2020.01)
*B60W 40/02* (2006.01)
*B60W 40/08* (2012.01)
*B60W 50/00* (2006.01)

(52) U.S. Cl.
CPC ............ *B60W 50/14* (2013.01); *B60W 40/02* (2013.01); *B60W 40/08* (2013.01); *B60W 2050/0028* (2013.01); *B60W 2050/0083* (2013.01); *B60W 2510/207* (2013.01); *B60W 2555/20* (2020.02)

(58) Field of Classification Search
CPC ...... B60W 50/14; B60W 40/02; B60W 40/08; B60W 2555/20; B60W 2050/0028; B60W 2050/0083; B60W 2510/207
USPC ......................................................... 340/439
See application file for complete search history.

(56) References Cited

U.S. PATENT DOCUMENTS

| 10,395,332 | B1* | 8/2019 | Konrardy | G01S 5/0027 |
| 11,441,916 | B1* | 9/2022 | Konrardy | G01C 21/343 |
| 2008/0208393 | A1* | 8/2008 | Schricker | G08G 1/20 701/1 |
| 2017/0298849 | A1* | 10/2017 | Be | B60K 35/28 |
| 2020/0164891 | A1* | 5/2020 | Bender | B60W 50/0098 |
| 2020/0317216 | A1* | 10/2020 | Konrardy | B60W 30/182 |

FOREIGN PATENT DOCUMENTS

JP 2022-097299 A 6/2022

OTHER PUBLICATIONS

Siyu Tao et al. "Enhanced Collaborative Optimization Using Alternating Direction Method of Multipliers" Structural and Multidisciplinary Optimization 58, Apr. 27, 2018, pp. 1571-1588.

* cited by examiner

*Primary Examiner* — Naomi J Small
(74) *Attorney, Agent, or Firm* — SoraIP, Inc.

(57) ABSTRACT

The information processing device includes a processor, and the processor inputs information on a course on which the vehicle travels, setup information on a setup of the vehicle, and feedback information from a driver driving the vehicle into a learned model, and proposes an optimal setup when the vehicle travels on the course based on an output from the learned model.

7 Claims, 5 Drawing Sheets

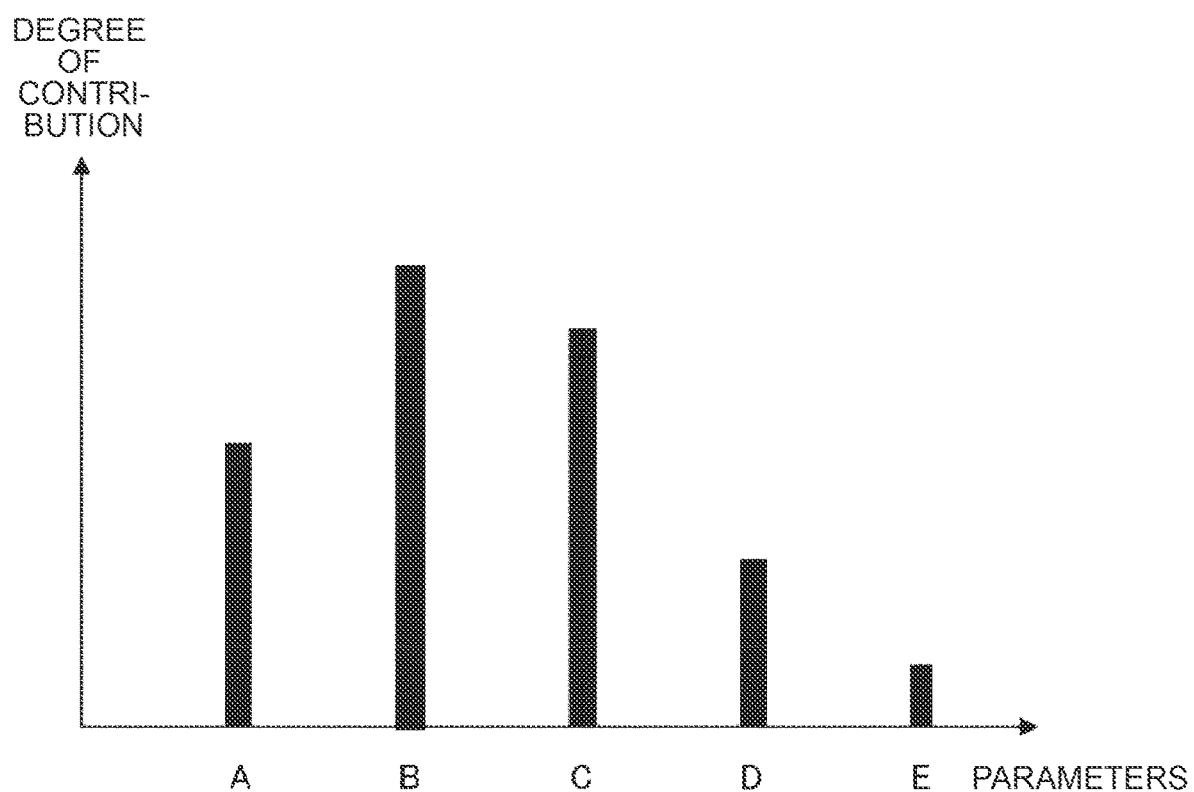

INFORMATION PROCESSING DEVICE AND INFORMATION PROCESSING METHOD

CROSS-REFERENCE TO RELATED APPLICATION

This application claims priority to Japanese Patent Application No. 2022-186699 filed on Nov. 22, 2022, incorporated herein by reference in its entirety.

BACKGROUND

1. Technical Field

The present disclosure relates to information processing devices and information processing methods.

2. Description of Related Art

Japanese Unexamined Patent Application Publication No. 2022-97299 (JP 2022-97299 A) discloses a technique intended to provide a design device. This design device includes a learned model storage unit and an optimal value determination unit. The learned model storage unit stores a plurality of learned models produced by machine learning using a plurality of training datasets including explanatory variables and objective variables. The design specifications of a structure constituting an equipment machine are used as the explanatory variables, and a plurality of performance elements having a trade-off relationship in the structure are used as the objective variables. The optimal value determination unit acquires a plurality of performance element estimation values that is output when the design specifications are input to each of the learned models, and determines optimal values of the design specifications by multi-objective optimization based on a plurality of objective functions for the performance element estimation values. The design device can thus determine optimal values of design specifications of a structure constituting an equipment machine in a short time while taking into consideration performance elements of the structure that have a trade-off relationship.

SUMMARY

In motorsports, however, optimal values of the setup of a vehicle vary due to disturbance factors such as temperature, humidity, wind speed, and wind direction on the day. It is therefore necessary to consider these disturbance factors. In learned models that are produced by conventional machine learning, disturbance factors are considered to be constant, which results in differences from actual measured values.

Moreover, when a user does not want to change part of explanatory variables or does not want to change a certain value of objective variable, the learned models predict optimal values by handling all the variables as variables, unless those values are constrained.

The present disclosure was made in view of the above circumstances, and it is an object of the present disclosure to provide an information processing device and an information processing method that propose an optimal setup of a vehicle by using feedback information from a driver who drives the vehicle as a constraint condition.

An information processing device according to a first aspect of the present disclosure includes a processor. The processor is configured to input information on a course on which a vehicle travels, setup information on a setup of the vehicle, and feedback information from a driver who drives the vehicle to a learned model, and propose an optimal setup for the vehicle to travel on the course, based on an output from the learned model.

An information processing device according to a second aspect of the present disclosure is the information processing device according to the first aspect, wherein the optimal setup is a setup considering a handling characteristic of the vehicle according to the driver, and the feedback information includes information on the handling characteristic of the vehicle according to the driver.

An information processing device according to a third aspect of the present disclosure is the information processing device according to the first aspect, wherein the processor further acquires environment information on an environment in which the vehicle travels on the course, and updates the learned model using the environment information.

An information processing device according to a fourth aspect of the present disclosure is the information processing device according to the first aspect, wherein the processor calculates and presents a degree of contribution of each parameter of the vehicle when proposing the optimal setup.

An information processing method according to a fifth aspect of the present disclosure is an information processor method including performing by a processor a process of inputting information on a course on which a vehicle travels, setup information on a setup of the vehicle, and feedback information from a driver who drives the vehicle to a learned model, and proposing an optimal setup for the vehicle to travel on the course, based on an output from the learned model.

According to the present disclosure, an information processing device can be provided that proposes an optimal setup of a vehicle using feedback information from a driver who drives a vehicle as a constraint condition.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating an example of presentation of information by the information processing device.

DETAILED DESCRIPTION OF EMBODIMENTS

Figure 1:
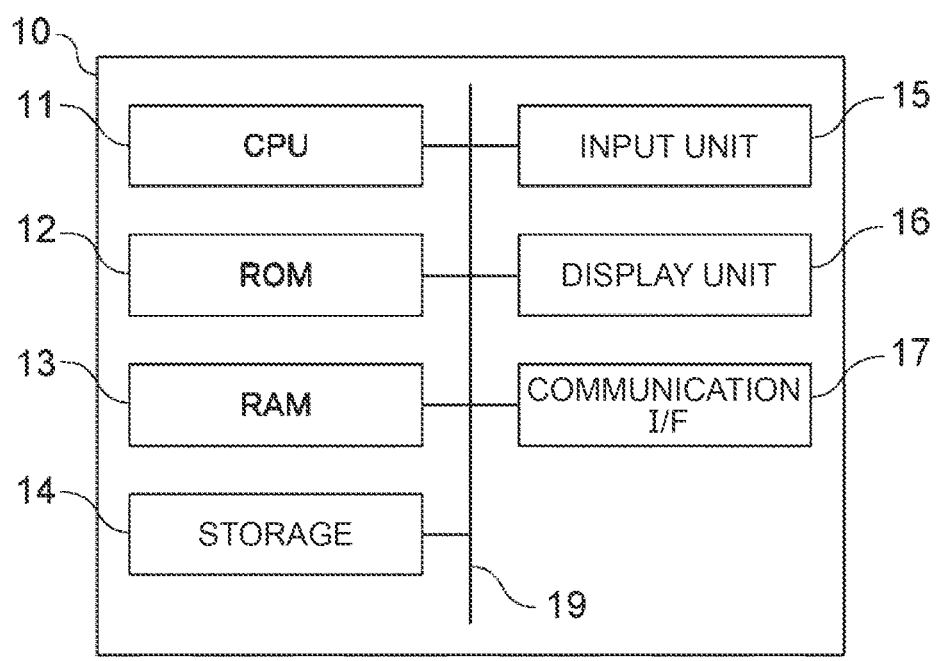
FIG. 1 is a block diagram illustrating an example of a hardware configuration of an information processing device according to an embodiment.

Hereinafter, an example of an embodiment of the present disclosure will be described with reference to the drawings. The same reference signs are assigned to the same or equivalent components and parts in the drawings. In addition, the dimensional ratios in the drawings are exaggerated for convenience of description and may differ from the actual ratios.

FIG. 1 is a block diagram illustrating an example of a hardware configuration of an information processing device 10 according to the present embodiment. The information processing device 10 is a device that proposes an optimal setup of a vehicle, particularly a vehicle that is used in a motorsport, by using a learned model produced by machine learning. Items proposed by the information processing device 10 as an optimal setup using the learned model include an engine output, a vehicle height, a wing height, a wing angle, and the like.

As illustrated in FIG. 1, the information processing device 10 includes a Central Processing Unit (CPU) 11, Read Only Memory (ROM) 12, Random Access Memory (RAM) 13, a storage 14, an input unit 15, a display unit 16, and communication interfaces (I/F) 17. The components are communicably connected to each other via a bus 19.

CPU 11 is a central processing unit that executes various programs and controls each unit. That is, CPU 11 reads the program from ROM 12 or the storage 14, and executes the program using RAM 13 as a working area. CPU 11 performs control of the above-described configurations and various arithmetic processes in accordance with programs recorded in ROM 12 or the storage 14. In the present embodiment, ROM 12 or the storage 14 stores an information processing program that proposes an optimal setup of the vehicle.

ROM 12 stores various programs and various data. RAM 13 temporarily stores a program/data as a working area. The storage 14 is constituted by a storage device such as a Hard Disk Drive (HDD), Solid State Drive (SSD), or flash memory, and stores various programs including an operating system and various types of data.

The input unit 15 includes a pointing device such as a mouse and a keyboard, and is used to perform various inputs.

The display unit 16 is, for example, a liquid crystal display, and displays various kinds of information. The display unit 16 may function as the input unit 15 by employing a touch panel method.

The communication interface 17 is an interface for communicating with other devices, and standards such as Ethernet (registered trademark) and FDDI, Wi-Fi (registered trademark) are used, for example.

When the above-described information processing program is executed, the information processing device 10 realizes various functions using the above-described hardware resources. A functional configuration realized by the information processing device 10 will be described.

Figure 2:
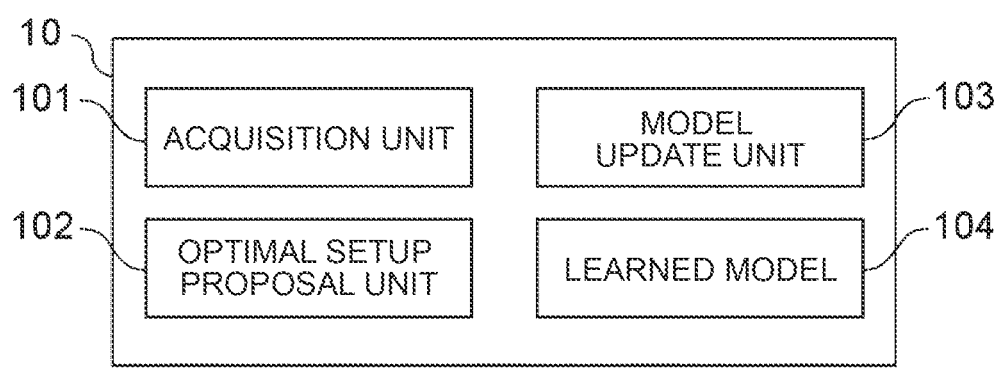
FIG. 2 is a block diagram illustrating an example of a functional configuration of an information processing device.

FIG. 2 is a block diagram illustrating an example of a functional configuration of the information processing device 10.

As illustrated in FIG. 2, the information processing device 10 includes, as functional components, an acquisition unit 101, an optimal setup proposal unit 102, a model update unit 103, and a learned model 104. The respective functional configurations are realized by CPU 11 reading and executing the information processing program stored in ROM 12 or the storage 14.

The acquisition unit 101 acquires various kinds of information for proposing the optimal setup of the vehicle. The various kinds of information acquired by the acquisition unit 101 include information on a course on which the vehicle travels, environment information on the travel of the vehicle, setup information on the setup of the vehicle, and feedback information from a driver driving the vehicle. The information on the course on which the vehicle travels includes, for example, information on the total length of the course, straight distance information between the corners, distance information of each corner, angle information of each corner, and the like. The environment information during the traveling of the vehicle includes information such as weather, temperature, humidity, wind speed, wind direction, and road surface grip. The setup information includes, for example, information such as the output of the engine, the tire pressure, the damping force of the suspension, the vehicle height, the height of the wings, and the angle of the wings. The feedback information includes, for example, information on a feeling (oversteer or understeer) of each corner felt by the driver when the driver travels on the course in the vehicle.

Further, the acquisition unit 101 acquires the actual measurement time when the vehicle subjected to the optimal setup proposed by the optimal setup proposal unit 102 described later travels on the course.

The optimal setup proposal unit 102 inputs the information acquired by the acquisition unit 101 to the learned model 104 that has been subjected to machine learning in advance. The optimal setup proposal unit 102 proposes an optimal setup when the vehicle travels on a course by using the data output from the learned model 104. The optimal setup proposed by the optimal setup proposal unit 102 is a setup considering Key Performance Indicators (KPI) of the vehicle according to the driver of the vehicle, and is, for example, a setup considering the handling characteristic according to the driver of the vehicle. The optimal setup proposal unit 102 also presents information on an assumed time when the vehicle travels on the course in the proposed optimal setup. Note that the learned model 104 is a model that is machine-learned by an arbitrary method in consideration of environment information such as weather, temperature, humidity, wind speed, wind direction, and road surface grip.

The model update unit 103 updates the learned model 104 using the information acquired by the acquisition unit 101. Specifically, the model update unit 103 compares the estimated time when the vehicle travels on the course in the optimal setup with the actual measurement time, and updates the learned model 104 based on the comparison result.

An example of the update processing of the learned model 104 by the model update unit 103 in the case of traveling of the circuit is shown. Let n be the number of corners of the circuit, $b_i$ (i is from 1 to n) be the calculated values of the mean vehicle speed at each corner and the max value $G_{max}$ of the lateral gravitational acceleration, and $f_i$ are predicted by the learned model 104. The environment variable required to find $f_i$ is x. Note that t is the number of environment variables.

$$x \in \mathbb{R}^t$$

The error δ between the measured value and the prediction result by the learned model 104 can be expressed by the following equation.

$$\delta = \sum_{i=1}^{n}(b_i - f_i(x))$$

The user tunes the environment variable x such that δ is minimal for each index such as average vehicle speed, lateral gravitational acceleration, and the like. The optimized environment-variable $x^{opt}$ can be expressed by the following equation:

$$x^{opt} = \min_{x \in \mathbb{R}^l} \delta(x)$$

With such a configuration, the information processing device 10 can propose an optimal setup when the vehicle travels on a course, and can tune the learned model 104 used when proposing an optimal setup.

Next, the operation of the information processing device 10 will be described.

Figure 3:
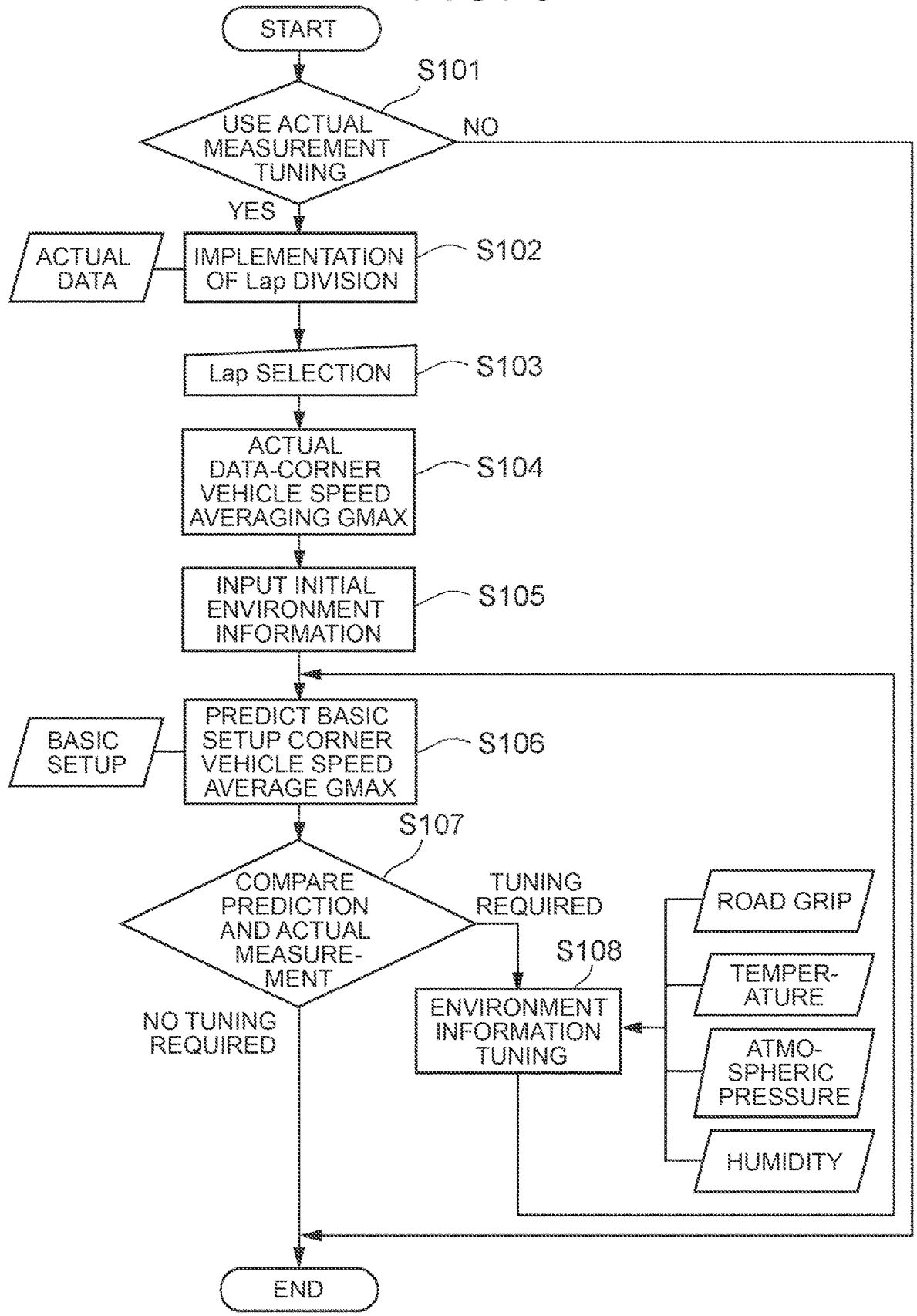
FIG. 3 is a flowchart illustrating an example of a flow of information processing by the information processing device.

FIG. 3 is a flowchart illustrating an example of a flow of information processing by the information processing device 10. CPU 11 reads the information processing program from ROM 12 or the storage 14, develops the information processing program in RAM 13, and executes the information processing.

In S101, CPU 11 determines whether to tune the learned model 104 using the actual measurement data according to an instruction from the user. When tuning of the learned model 104 using the actual measurement data is not executed according to the instruction of the user (S101; No), CPU 11 ends the subsequent process.

When tuning of the learned model 104 using the actual measurement data is performed (S101; Yes), CPU 11 acquires the actual measurement data and divides the actual measurement data for each lap in S102 following S101.

Following S102, in S103, CPU 11 selects a lap to be used for tuning according to the user's instruction.

Following S103, in S104, CPU 11 acquires the mean vehicle speed and the lateral acceleration (lateral GMAX) of the corners.

Subsequent to S104, in S105, CPU 11 obtains the initial environment information by inputting by the user. The initial environment information includes information about climate, such as weather, temperature, humidity, wind speed, wind direction, road grip, and the like.

Following S105, in S106, CPU 11 predicts the mean vehicle speed and lateral acceleration of the corners according to the basic setup of the vehicle using the learned model 104.

Following S106, in S107, CPU 11 compares the forecast using the learned model 104 with the actual measurement to allow the user to determine whether tuning of the learned model 104 is required. The determination by the user is performed by CPU 11 causing the user to input the predetermined user interface displayed on the display unit 16.

If the user determines that tuning of the learned model 104 is required, then following S107, in S108, CPU 11 receives tuning of environment information such as weather, temperature, moisture, wind speed, wind direction, road gripping, etc. When the tuning of the environment information is received, CPU 11 returns to S106 and predicts the mean vehicle speed and lateral acceleration of the corners using the learned model 104 based on the tuned environment information.

On the other hand, when the user determines that tuning of the learned model 104 is not required, CPU 11 ends the series of processes.

The information processing device 10 can propose the optimal setup of the vehicle using the machine learning model 104 that is tuned in accordance with the environment conditions of the site by executing the series of processes illustrated in FIG. 3.

In order to propose an optimal setup of a vehicle, it is necessary not only to propose a setup with a fast lap time of one lap, but also to correct the handling characteristic of each corner according to the chief complaint of the driver. In order to correct the handling characteristic, it is necessary to consider both the simulation using the learned model 104 and the feedback from the driver.

The information processing device 10 according to the present embodiment can accept input of feedback information from the driver, and compares the feedback information from the driver with the handling characteristic in the basic setup proposed by the learned model 104. By this comparison, the information processing device 10 according to the present embodiment can realize both correction of the handling characteristic and improvement of lap time.

An example of a process of correcting the handling characteristic by the optimal setup proposal unit 102 will be described below. When considering a corner a in a course, suppose that the driver had a problem with the handling characteristic for that corner. Assuming that the number of predicted cases of Design of Experiments (DOE) is n and the handling characteristic predicted by the learned model 104 is g, the number of predicted cases is narrowed down as follows, considering the handling characteristic.

The narrowing down when the driver determines that the corner a is oversteer is expressed by the following formula. $g_a(i)$ is the handling characteristic predicted in each prediction case, and $g_{a\_base}$ is the handling characteristic predicted by the learned model 104.

$$g_a(i) - g_{a\_base} \geq 0 (i=1,2,\ldots,n)$$

On the other hand, the narrowing down in a case where the driver determines that the corner a is under-steer is represented by the following formula.

$$g_a(i) - g_{a\_base} \leq 0 (i=1,2,\ldots,n)$$

The optimal setup proposal unit 102 performs this narrowing down at all corners of the course. Assuming that the remaining number of cases is n', the optimal setup proposal unit 102 selects i in which $\delta$ is the smallest in the following equation. By finding i where $\delta$ is the minimum value, it is possible to search for an optimal setup in which the fastest time can be expected, taking into consideration the handling characteristic of each corner.

$$\delta = f(i) - f_{base}(i=1,2,\ldots,n')$$

Figure 4:
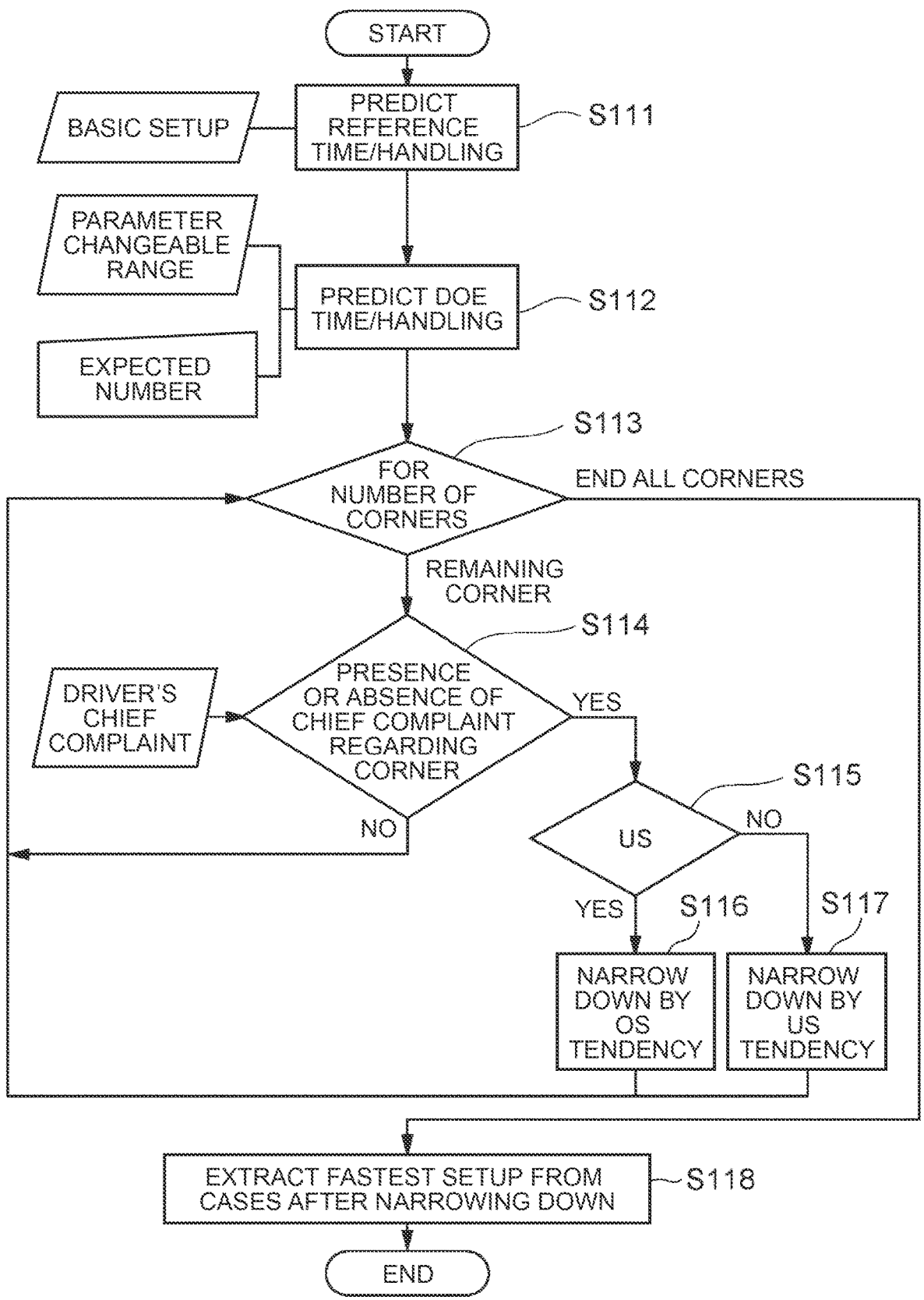
FIG. 4 is a flowchart illustrating an example of a flow of information processing by the information processing device.

FIG. 4 is a flowchart illustrating an example of a flow of information processing by the information processing device 10. CPU 11 reads the information processing program from ROM 12 or the storage 14, develops the information processing program in RAM 13, and executes the information processing. The flowchart shown in FIG. 4 is a flowchart for searching for an optimal setup in consideration of the handling characteristic.

In S111, CPU 11 predicts the reference time and the handling characteristic using the basic setup of vehicles using the learned model 104.

Following S111, in S112, CPU 11 narrows down the predicted reference times and the handling characteristics according to the variable parameter scope and the narrowed predicted case count.

Following S112, in S113, the CPU 11 determines whether all corners have been processed. If the process has not been completed for all corners, CPU 11 then determines in S114 whether there has been any feedback (chief complaint) from the driver at that corner.

If there is feedback from the driver at that corner (S114; Yes), then in S115, CPU 11 determines whether the corner was an US.

If the feedback is S115; Yes, then CPU 11 narrows down in S116 with a tendency to be OS for the corners. On the other hand, if the feedback indicates that the oversteer has occurred (S115; No), CPU 11 then narrows down the corners in S117 with a tendency to understeer.

In the determination of S113, if all corners have been processed, then CPU 11 extracts an optimal setup from the case after narrowing down in S118.

By executing a series of processes, the information processing device 10 can search for an optimal setup in which the fastest time can be expected in consideration of the handling characteristic of each corner. Note that the information processing device 10 may search for the optimal setup after receiving feedback from the driver at each of the entrance and exit of the corner when searching for the optimal setup in which the fastest time can be expected, taking into consideration the handling characteristic of each corner.

Figure 5:
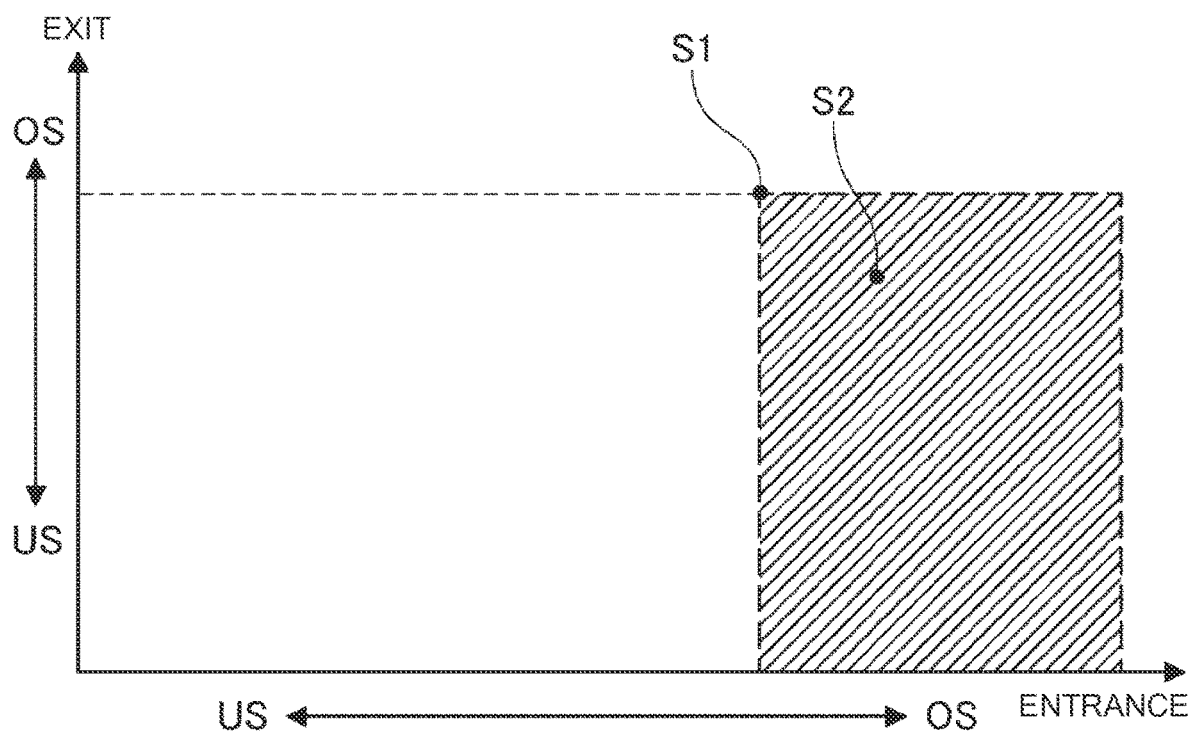
FIG. 5 is a diagram illustrating an example of extraction of an optimal setup by the information processing device.

FIG. 5 is a diagram illustrating an example of extraction of an optimal setup by the information processing device 10. FIG. 5 shows an example of searching for an optimal setup considering the handling characteristic at the entrance and exit of a corner. In the graph of FIG. 5, the positive direction of each axis is the oversteer tendency, and the negative direction is the understeer direction. The sign S1 in FIG. 5 is a point in which the handling characteristic in the setting is plotted.

It is assumed that the driver feeds back that the vehicle is under-steered at the entrance of the corner and over-steered at the exit with the setting that the handling characteristic is the sign S1. In that case, the entrance is constrained to the oversteer direction, i.e. the positive direction of the X-axis, and the exit is constrained to the understeer direction, i.e. the direction of the Y-axis. Therefore, the information processing device 10 searches for the optimal setup in the range marked with the pattern of the graph in FIG. 5. In FIG. 5, it is assumed that the setting indicated by the sign S2 is an optimal setup.

If the information processing device 10 does not simply present the contents of the setup, but does not present the history that led to the determination that the setup is optimal, it is difficult for the engineer of the vehicle to actually adopt the optimal setup determined by the information processing device 10.

Therefore, the information processing device 10 according to the present embodiment may present not only the proposal of the optimal setup using the learned model 104 but also the time expected by the optimal setup (the lap time of one lap and the sector time of each sector), and the information processing device 10 may present the tendency of the time by the setup in the form of a scatter plot.

Figure 6:
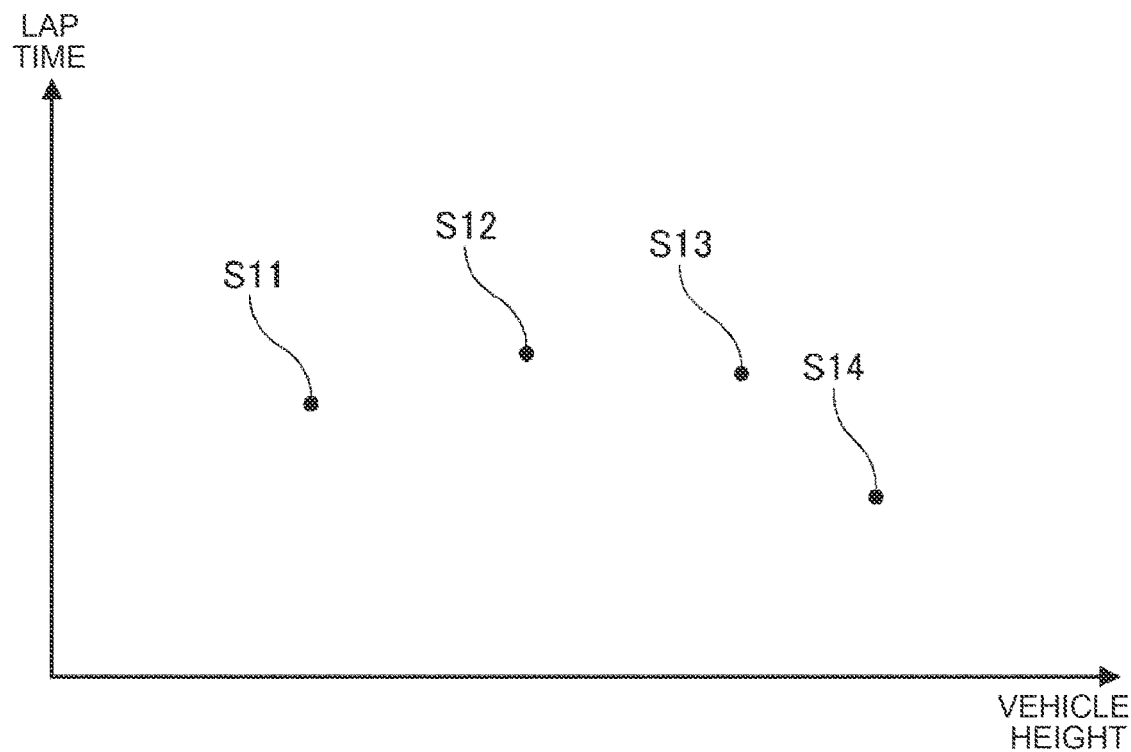
FIG. 6 is a diagram illustrating an example of presentation of information by an information processing device.

FIG. 6 is a diagram illustrating an example of presentation of information by the information processing device 10. The horizontal axis of the graph shown in FIG. 6 indicates the vehicle height, and the vertical axis indicates the lap time of one lap. That is, the graph shown in FIG. 6 plots the relationship between the vehicle height and the lap time. In FIG. 6, S14 are shown graphically from four point S11, each point representing the relation between the vehicle height and the lap time in the setup of the corresponding vehicle.

The information processing device 10 presents a graph as shown in FIG. 6, so that the engineer of the vehicle can grasp how much the vehicle height is to run at what lap time. In the case of FIG. 6, it is shown that if the vehicles are set up corresponding to the point S14, they can run fastest.

When the graph as shown in FIG. 6 is shown, the information processing device 10 may change the information indicated by the horizontal axis or the vertical axis by an input from the user.

The setup of the vehicle may include a parameter that greatly affects the lap time and a parameter that has a small impact on the lap time. Therefore, the information processing device 10 may calculate and present a degree of contribution of each parameter of the setup to the lap time.

FIG. 7 is a diagram illustrating an example of presentation of information by the information processing device 10. The graph illustrated in FIG. 7 is a graph illustrating an example of a relationship between each parameter of the setup and the degree of contribution. The information processing device 10 can calculate the degree of contribution of each parameter of the vehicle and present the calculated degree of contribution as shown in the graph shown in FIG. 7 to provide a determination material for determining which parameter should be preferentially adjusted to the engineer of the vehicle.

Note that the information processing executed by CPU reading the software (program) in the above-described embodiments may be executed by various processors other than CPU. Examples of the processor include a Programmable Logic Device (PLD) in which a circuit configuration can be changed after manufacturing of Field-Programmable Gate Array (FPGA), and the like, and a dedicated electric circuit that is a processor having a circuit configuration designed exclusively for executing a particular process such as Application Specific Integrated Circuit (ASIC), and the like. Further, the information processing may be executed by one of these various processors, or may be executed by a combination of two or more processors (for example, a plurality of FPGA, a combination of CPU and FPGA, and the like) of the same type or different types. The hardware structure of each of the various processors is, more specifically, an electric circuit in which circuit elements such as semiconductor elements are combined.

In the above embodiments, the information processing program is stored (installed) in ROM or the storage in advance, but the present disclosure is not limited thereto. The program may be provided in a form recorded on a non-transitory recording medium such as Compact Disk Read Only Memory (CD-ROM), Digital Versatile Disk Read Only Memory (DVD-ROM), and Universal Serial Bus (USB). Further, the program may be downloaded from an external device via a network.

What is claimed is:

1. An information processing device for obtaining a setup of a vehicle that includes parameters specifying characteristics of the vehicle, the information processing device comprising a processor configured to:
    receive course information on a course on which the vehicle travels and feedback information from a driver who drives the vehicle on the course, the feedback information including information on a handling characteristic of the vehicle when the vehicle passes at least one corner on the course;
    define a predetermined number of setups, each of the setups including the parameters each falling within a predetermined scope;
    obtain handling characteristics corresponding to the predetermined number of setups, respectively;

obtain narrowed setups that have been narrowed from the predetermined number of setups based on the feedback information and the obtained handling characteristics; and propose an optimal setup with which the vehicle achieves the fastest lap time to complete the course from among the narrowed setups.

2. The information processing device according to claim 1, further comprising a display, wherein the processor calculates and displays on the display a degree of contribution of each parameter of the vehicle when proposing the optimal setup.

3. An information processing method performed by a processor for obtaining a setup of a vehicle that includes parameters specifying characteristics of the vehicle, the information processing method comprising:

receiving course information on a course on which the vehicle travels and feedback information from a driver who drives the vehicle on the course, the feedback information including information on a handling characteristic of the vehicle when the vehicle passes at least one corner on the course;

defining a predetermined number of setups, each of the setups including the parameters each falling within a predetermined scope;

obtaining handling characteristics corresponding to the predetermined number of setups, respectively;

obtaining narrowed setups that have been narrowed from the predetermined number of setups based on the feedback information and the obtained handling characteristics; and proposing an optimal setup with which the vehicle achieves the fastest lap time to complete the course from among the narrowed setups.

4. An information processing device for obtaining a setup of a vehicle that includes parameters specifying characteristics of the vehicle, the information processing device comprising a processor configured to:

receive course information on a course on which the vehicle travels and feedback information from a driver who drives the vehicle on the course, the feedback information including information on a handling characteristic of the vehicle when the vehicle passes at least one corner on the course;

use a learned model to convert the received course information into a first setup;

use the learned model to convert the first setup into a first handling characteristic to be exhibited by the vehicle when the vehicle travels on the course with the first setup;

define a predetermined number of second setups, each of the second setups including the parameters each falling within a predetermined scope;

obtain second handling characteristics corresponding to the second setups, respectively;

obtain third setups that have been narrowed from the second setups based on the feedback information, the first handling characteristic, and the second handling characteristics; and propose an optimal setup with which the vehicle achieves the fastest lap time to complete the course from among the third setups.

5. The information processing device according to claim 4, wherein the information on the handling characteristic included in the feedback information indicates whether an oversteer tendency or an understeer tendency has occurred when the vehicle passes each corner on the course, and the processor is configured to obtain the third setups by selecting, from among the second setups, setups for each of which a corresponding second handling characteristic is not less than the first handling characteristic when the information on the handling characteristic included in the feedback information indicates that the oversteer tendency has occurred, and selecting, from among the second setups, setups for each of which a corresponding second handling characteristic is not greater than the first handling characteristic when the information on the handling characteristic included in the feedback information indicates that the understeer tendency has occurred.

6. The information processing device according to claim 4, wherein the processor is further configured to acquire environment information on an environment in which the vehicle travels on the course, and update the learned model using the environment information.

7. The information processing device according to claim 4, wherein the optimal setup includes at least one of an engine output, a vehicle height, a wing height, and a wing angle.

* * * * *